United States Patent
Haller et al.

(10) Patent No.: US 8,412,552 B2
(45) Date of Patent: Apr. 2, 2013

(54) TRUST LOOKUP PROTOCOL

(75) Inventors: Jochen Haller, Karlsruhe (DE); Philip Robinson, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 2159 days.

(21) Appl. No.: 10/950,790

(22) Filed: Sep. 28, 2004

(65) Prior Publication Data
US 2006/0069658 A1    Mar. 30, 2006

(51) Int. Cl.
*G06Q 10/00* (2012.01)
(52) U.S. Cl. ............ 705/7.14; 705/7.11; 705/7.12; 705/7.15; 705/7.17; 705/7.22; 705/7.23; 705/7.25; 705/7.38; 705/7.39; 705/7.42; 705/80; 705/14.61
(58) Field of Classification Search ............... 705/7–11, 705/80, 14.61; 707/1
See application file for complete search history.

(56) References Cited

U.S. PATENT DOCUMENTS

| | | | |
|---|---|---|---|
| 6,578,005 B1 * | 6/2003 | Lesaint et al. ............ | 705/8 |
| 7,047,208 B1 * | 5/2006 | Nelson et al. ............ | 705/10 |
| 7,356,484 B2 * | 4/2008 | Benjamin et al. ........ | 705/11 |
| 2001/0047276 A1 * | 11/2001 | Eisenhart ............... | 705/1 |
| 2002/0052862 A1 * | 5/2002 | Scott et al. .............. | 707/1 |
| 2002/0087380 A1 * | 7/2002 | Wang et al. ............. | 705/8 |
| 2002/0099578 A1 * | 7/2002 | Eicher et al. ............ | 705/7 |
| 2002/0099579 A1 * | 7/2002 | Stowell et al. ........... | 705/7 |
| 2004/0111639 A1 * | 6/2004 | Schwartz et al. ........ | 713/201 |
| 2005/0091172 A1 * | 4/2005 | King et al. .............. | 705/64 |
| 2007/0094063 A1 * | 4/2007 | Skibinski ............... | 705/8 |
| 2008/0040207 A1 * | 2/2008 | McKay et al. ........... | 705/11 |

OTHER PUBLICATIONS

Sycara et al, "Dynamic Discovery and Coordination of Agent-Based Semantic Web Services", May o Jun. 2004 Published by the IEEE Computer Society.*

* cited by examiner

*Primary Examiner* — Mamon Obeid
(74) *Attorney, Agent, or Firm* — Fish & Richardson P.C.

(57) ABSTRACT

A trust look-up protocol is described that allows a meta-trusted third party, or trust directory, to mediate between parties of potential business collaborations and trusted third parties that are counted on to authorize or otherwise validate the business collaborations. The trust directory receives a trust request for a collaboration from one or more parties, and, based on the request, determines a specialty of a trusted third party that is suited to the request and the collaboration. The trust directory then obtains interface information for the trusted third party for forwarding to the requesting party. In this way, the trusted third party may make a determination as to whether the requesting party should proceed in the business collaboration. Afterwards, the trust directory may monitor communications that take place as part of the collaboration, for use in evaluating future requests and collaborations.

19 Claims, 4 Drawing Sheets

| Resources | Number of Employees | Annual Revenue | Available assets | |
|---|---|---|---|---|
| Partner A | | | | |
| Partner B | | | | |
| Partner C | | | | |
| | | | | |

| Reliability | Previous orders met | Number of available workers | Previous Delays | |
|---|---|---|---|---|
| Partner A | | | | |
| Partner B | | | | |
| Partner C | | | | |
| | | | | |

| Economic Factors | Average part price | Exchange Rate | Delivery Costs | |
|---|---|---|---|---|
| Partner A | | | | |
| Partner B | | | | |
| Partner C | | | | |
| | | | | |

TRUST LOOKUP PROTOCOL

TECHNICAL FIELD

This description relates to collaborative business processes.

BACKGROUND

Business interests often work with one another toward a common goal. In such partnerships or collaborations, each business typically provides value in its own area(s) of expertise. Businesses may work together for an extended period of time, intermittently over a given period of time, or only for a relatively brief time frame.

Once assembled, such partnerships provide the possibility of increased profitability for the businesses involved, and of lower prices for parties purchasing goods or services from the businesses. Moreover, as the businesses focus on their respective areas of expertise over time, their efficiency in these areas may increase, leading to still further increases in profit margins, and/or decreases in prices, as well as an increase in customer satisfaction.

SUMMARY

According to one general aspect, a system includes a trust registry operable to provide interface information for one of a plurality of trusted third parties to be used in determining a propriety of a collaboration between a first party and a second party, and a trust directory operable to receive a trust request from the first party that includes criteria associated with formation of the collaboration, and to obtain the interface information for the trusted third party from the trust registry for forwarding to the first party, based on the criteria.

Implementations may include one or more of the following features. For example, the trust registry may be operable to associate each of the trusted third parties with one of a plurality of collaboration specialties, and the trust directory may be operable to determine a required collaboration specialty that is associated with the trusted third party, based on the criteria.

The trust directory may be operable to determine the interface information of the trusted third party, based on the required collaboration specialty. The trust directory may include a look-up system operable to correlate the collaboration specialties with the criteria, and a trust service that is operable to communicate with the first party to receive the trust request and output the interface information, and which may be further operable to access the look-up system to associate the criteria with the required collaboration specialty, and thereby determine the interface information of the trusted third party. The trust service may be implemented as a web service.

The trust request may be formulated according to a data model that is designed to present the criteria to the trust service in a format that is compatible with the look-up service and the trust registry. The criteria may include trust factors used by the trusted third party in making a trust determination as to whether the second party is suitable for inclusion in the collaboration with the first party. The trust factors may be formulated according to the data model, and compatible with the trusted third party. The data model may be compatible with the second party, such that the trusted third party is enabled to request information from the second party regarding the trust factors.

The trust service directory may obtain access information for communicating with the trusted third party, and forward the access information with the interface information. The trust request may conform to a data model that describes a structure of information within the trust request, so that the trust request is required to meet constraints imposed by the data model. In this case, the trust request may be structured according to a defined XML schema.

The trusted third party may provide trust validation to the first party approving the collaboration using a web service. The trust directory may be operable to communicate with the trusted third party to determine whether the trusted third party is capable of authorizing the collaboration, based on the criteria.

The trust directory may be operable to aggregate trust information from the trusted third party with internally-available trust information for outputting to the first party with the interface information. The interface information may include access information associated with a web service operated by the trusted third party, where the access information may include information related to a session between the web service and the trust directory, and further wherein the trust directory may be operable to hand off the session to the first party.

The trust directory may be operable to mediate communication between the first party and the trusted third party, during which the trusted third party authorizes the collaboration. In this case, the trust directory comprises a monitor system that is operable to monitor collaboration communications between the first party and the second party, during the collaboration. Also, the trust directory may be operable to access the collaboration communications from the monitor system for use in responding to future trust requests.

According to another general aspect, a request is received for a trust determination from a first party, the request including criteria for a collaboration between the first party and a second party. The request is parsed to determine a trusted third party from among a plurality of trusted third parties for authorizing the collaboration, based on the criteria. Interface information for the trusted third party is obtained, and the interface information is provided to the first party.

Implementations may include one or more of the following features. For example, in parsing the request, each of the trusted third parties may be associated with one of a plurality of collaboration specialties, and a required collaboration specialty may be determined that is associated with the trusted third party, based on the criteria. In this case, obtaining the interface information for the trusted third party may include determining the interface information for the trusted third party, based on the required collaboration specialty.

In receiving the request, the request may be received in a format that is selected to permit communication between the first party, the second party, and the trusted third party, such that the trusted third party may obtain information regarding the criteria from the second party. In obtaining the interface information for the trusted third party, trust information from the trusted third party may be aggregated with internally-available trust information for outputting to the first party with the interface information. In obtaining the interface information for the trusted third party, access information associated with the trusted third party may be obtained, and, in providing the interface information, the access information may be provided to the first party.

Communication between the first party and the trusted third party may be mediated, and, during the mediation, the trusted third party may authorize the collaboration. In this case, the collaboration communications between the first party and the second party may be monitored, during the collaboration. Also, in parsing the request, the collaboration communications may be accessed to use in conjunction with the criteria to determine the trusted third party.

The second party may be selected from among a plurality of parties that are eligible for the collaboration. In receiving the request, a second request may be received from the second party for authorization of the first party by the trusted third party.

The details of one or more implementations are set forth in the accompanying drawings and the description below. Other features will be apparent from the description and drawings, and from the claims.

DESCRIPTION OF DRAWINGS

FIGS. 3A-3C are charts illustrating trust factors used by the trust determination system of FIG. 1 in making a trust determination.

DETAILED DESCRIPTION

Figure 1:
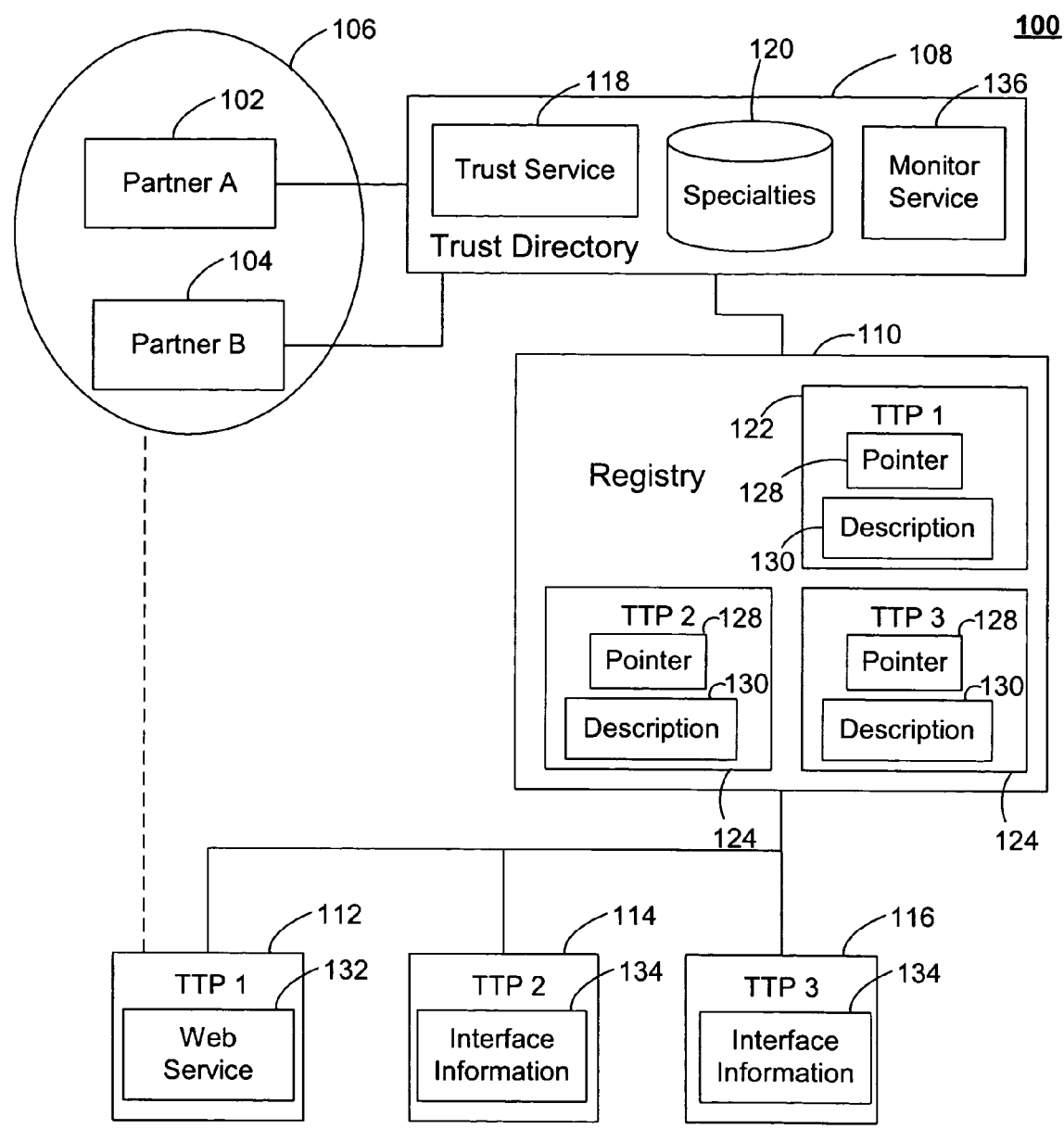
FIG. 1 is a block diagram of a trust determination system.

FIG. 1 is a block diagram of a trust determination system 100. The trust determination system 100 is designed to allow business interests to determine, with some degree of confidence, whether or how to work with one another toward a common goal. The trust determination system 100, for example, may be instrumental in locating potential partners, evaluating whether a known potential partner may be trusted to perform to a desired level in the context of a particular project, and collecting information about on-going business collaborations for future trust determinations.

In FIG. 1, a first partner 102 generally represents a business interest, such as, for example, an enterprise, corporation, sole proprietorship, or any other type of business interest. Of course, the partner 102 also may represent other types of entities, such as, for example, schools, charitable foundations, or other non-profit entities.

The partner 102 seeks to form a partnership or other type of collaboration with another entity or entities, for the sake of achieving some goal. For example, the partner 102 may represent a manufacturing company that seeks to assemble a large or complex product, such as a passenger jet. In such cases, it may be impractical or impossible for the partner 102 to maintain a fill supply chain for the assembly and production of a required number of jets.

For instance, if an airline requests that the partner 102 produce twenty new jets by the end of the current year, it is unlikely that the partner 102 will currently posses all the resources necessary to achieve this task. Instead, the partner 102 will generally assemble multiple partners, each specializing in the production or assembly of some particular subset of aircraft parts, and the partner 102 will retain for itself only those roles in which it can maintain the profitability of the project as a whole.

Many other examples exist of situations in which partners desire to work together to achieve a common goal. For example, a general contractor may assemble a team of subcontractors, in order to complete a construction project. In e-commerce, a business interest may have expertise in producing and selling a product, but may wish to partner with a second business interest that has particular expertise in conducting web-based electronic transactions.

In these and other situations, the first partner 102 seeks a second partner 104 (or partners) who has the desired abilities, in order to form a business collaboration 106. The first partner 102 may or may not initially be aware of the existence or identity of the second partner 104 that potentially has the desired abilities. For example, the first partner 102 may know only the desired abilities of a potential partner, but may not know whether such a partner exists or is currently available for collaboration. In other situations, the first partner 102 may know a name or reputation of the second partner 104, or may have previously worked with the second partner 104 in another capacity.

In order to determine whether to enter into collaboration with the second partner 104, the first partner 102 must identify the second partner 104 (if necessary), and must try to determine whether the second partner 104 possesses the desired abilities with respect to the collaboration. For example, in the example given above related to production of an airplane, the first partner 102 may require production of a certain component. The first partner 102 may know that the second partner 104 specializes in producing this component, or may know of a number of potential partners that advertise an ability to produce the component, or may only know that the component is needed.

More particularly, the first partner 102 will generally have additional requirements for the production of the component. For example, the first partner 102 may require that a certain number of the components should be available within a given time frame, or that the produced components each have a defined reliability rating. Such production mandates may be set, for example, by a customer of the first partner 102 who has requested production of the passenger jets.

Even if such production requirements may be met by the second partner 104, the first partner 102 may wish to know whether the second partner 104 is capable of efficient interaction during the business collaboration. For example, if the first partner 102 and the second partner 104 each run separate management software, then both partners may have trouble communicating with one another during the collaboration (e.g., the second partner 104 may have difficulty updating an order status in a way that is meaningful to a system of the first partner 102). More generally, there may be many possible areas of system incompatibility between the potential partners, including, for example, back-end legacy systems, messaging techniques, and security protocols.

In short, the first partner 102 will generally wish to know characteristics of the second partner 104, including reliability, expertise, and availability, in order to make an informed decision as to whether the second partner 104 is suitable for inclusion in the collaboration 106. In other words, the first partner 102 will wish to know whether the second partner 104 should be trusted to perform in a suitable manner within the collaboration 106.

Assigning trust inappropriately in the formation of the collaboration 106 may prove detrimental or disastrous to the successful completion of the aim of the collaboration 106. For example, the first partner 102 may trust that the second partner 104 has sufficient capacity to produce a certain number of components, e.g., jet components, in a certain time frame, when, in fact, the second partner 104 has already committed its resources to another collaboration (perhaps in the mistaken belief that both collaborations could be successfully run concurrently). In such a case, it may not become evident that the second partner 104 is not able to meet its production goal until after it is too late for the first partner 102 to replace the second partner 104 in the collaboration 106 (and still meet the existing time limit).

In FIG. 1, a trust directory 108 is provided that is operable to receive a request for a trust determination from the first partner 102, and is further operable to interact with a registry 110 to determine a trusted third party 112 from among a plurality of trusted third parties 112, 114, and 116.

More specifically, the trust directory 108 receives the trust determination request from the first partner 102 according to a pre-specified data model, where this data model is designed to be compatible with an operation of the trust directory 108, the registry 110, and the trusted third party 112. The trusted third party 112 is operable to communicate with the second party 104 using the pre-specified data model, or a compatible format. Thus, the data model used by the trust directory 108 is such that details of the trust determination request may be meaningfully compared with a performance description of potential partners, including, in the example of FIG. 1, the second partner 104.

The trust directory 108 includes a trust service 118 that initially receives the trust determination request from the first partner 102. In one implementation, the trust service provides an interface to the first partner 102 that is consistent with the pre-defined data model in which the trust service expects the trust determination request. As such, the trust determination request may have various forms, format, or content, but may nonetheless be parsed by the trust service 118, as described in more detail below.

The trust service 118 may be implemented using the Extensible Mark-up Language (XML), which provides a universal syntax for data description/structure that does not rely on any particular application logic. More generally, the trust service 118 may be written using virtually any programming language, such as, for example, the Java programming language. Then, the trust service 118 may be provided with an interface(s) that is designed to provide information from the, in this case, Java program, as an XML document to be used/accessed by the first partner 102.

In one implementation, the trust service 118 may be implemented as a web service. In general, such a web service may be deployed over the Internet, and may be designed to provide a specific functionality to a user. For example, a developer of a website may wish to provide a stock quotation service on the website, or a travel reservation/confirmation function. Such functionality may be added to the website simply by providing access to pre-existing services, even though such services may be running behind a firewall and may themselves have access to data that must be inaccessible to users of the website (e.g., travel information of other users).

Thus, in FIG. 1, the trust service 118 may be provided over the Internet or some other public or private computer network. Then, the first partner 102 may access the trust service 118 simply by visiting a known website, such as a secured website. The interface(s) provided by the trust service 118 may be provided such that the first partner 102 may easily select or define criteria for determining a potential partner. This criteria may then be included in the trust determination request in the pre-defined data model, so that the criteria may be communicated to the registry 110 and to the third party 112 in an expedient and meaningful fashion.

A manner in which the interface(s) of the trust service 118 are defined and described may be encapsulated in a document associated with the trust service 118. For example, the Web Services Description Language (WSDL) is a language used to describe interfaces or other characteristics of the trust service 118 in an XML document. That is, WSDL is intended to enable a user to build or use an application capable of talking to the trust service 118. Of course, the trust service 118 may use other standards to expose its interface(s), or may use a proprietary interface, as well.

In implementations in which the trust service 118 is implemented as a web service, existing techniques may be used for locating the trust service over a network of which the trust service 118 is a part. For example, the Universal Description, Discovery, and Integration (UDDI) specification is a specification used to describe a service, as well as how to discover the service and/or interact with it over the network. For example, a registry of services may be provided using UDDI, so that the first partner 102 may search for, find, and use the trust service 118.

In such implementations, another characteristic of the trust service 118 relates to how it transports XML information or documents from or to the first partner 102. That is, a particular messaging protocol is typically used that is designed to ensure that the first partner 102 correctly receives and interprets XML information from the trust service 118, and that ensures that the trust determination request from the first partner 102 is correctly routed to the trust service 118.

In order to transport the request from the first partner 102 to the trust service 118 (and vice-versa), it may be possible simply to use a standard transport protocol, such as, for example, the Hyper-Text Transfer Protocol (HTTP) or the Simple Message Transfer Protocol (SMTP). In other implementations, Simple Object Access Protocol (SOAP) may be used, which is a particular messaging protocol that was developed to encode XML information in a service request or response message. SOAP messages are intended to be independent of any particular operating system and may be transported by various protocols including, for example, HTTP or SMTP. SOAP clients have been created for numerous platforms and developmental environments, including, for example, programming languages Java, Perl, and C++, as well as the .NET environment developed by Microsoft.

In order to standardize communications between the first partner 102 and the trust service 118 in the manner referred to above, an XML schema may be used. XML schemas are capable of providing, for example, an XML vocabulary that express business rules and use the same syntax as XML documents provided by the trust service 118. To the extent that the first partner 102 and the trust service 118 agree to structure their respective XML documents according to a defined XML schema, the XML schema may be considered a contract between the first partner 102 and the trust service 118, as well as between other ones of the entities illustrated in FIG. 1, including the registry 110, the third party 112, and, potentially (at least indirectly through the third party 112), the second partner 104.

An XML schema is designed to ensure that an XML document is valid, in addition to being well-formed. In this context, an XML document is considered well-formed as long as it is syntactically correct. For example, the XML document should have all tags being fully-nested, and all tags should have an end tag (or be self-ending). When an XML document is well-formed, it should be in suitable condition for processing.

To be valid, the XML document must conform to a data model that describes the structure of the information within the document, so that the document is required to meet constraints (e.g., business rules) imposed by the model. For example, a valid XML document would only include tags of a pre-determined type or definition, and the order of the tags also may be specified.

An XML schema document generally contains metadata concerning data in the XML instance documents themselves. For example, the XML schema document may contain the datatype of the instance data, a range of values for the instance data, or a relationship between one piece of instance data and some other piece of instance data (e.g., a "parent/child" relationship). Thus, the XML schema defines content and structure that is allowed to occur within the document, as well as content and structure that is required within the document.

It should be understood that different types of schemas and schema languages may be used, even with respect to XML documents. For example, one schema language is known as a document type definition (DTD) language, while another type of schema language is known as XML Schema Definition (XSD). XSD is generally composed in XML, and therefore does not require a separate parser, as does DTD.

In some implementations, XML files may indicate where their schema is located by specifying it directly in the file. In other implementations, the schema may be located using UDDI, or a schema may be agreed to by the involved parties before information exchange occurs.

Upon receipt of the trust determination request, the trust service 118 parses the request and, based on the results of this parsing, consults an internal look-up database 120 to determine a specialty type associated with the request. The trust service 118 then contacts the registry 110, which contains records 122, 124, and 126 containing contact information and descriptive information for the corresponding trusted third parties 112, 114, and 116, respectively. More specifically, each record contains a pointer 128 and a description 130 for its corresponding trusted third party, so that the registry 110 and/or the trust directory 108 may contact the corresponding trusted third party.

In addition to parsing the trust determination request on a syntactic and grammatical level, the trust service 118 may use the XML schema to parse the trust determination request on a semantic level, as well. For example, within the trust determination request, it may be necessary to determine the meaning or context of certain words or other information in order to parse the request. Such functionality may be implemented using a domain ontology that maps a word and its associated meaning and concepts.

As a simple example, it may be the case that the first partner 102 lists names of relevant parties as "first name, last name," while the trusted third party 112 lists names as "last name, first name." In such cases, the trust service 118 may parse the word "Douglas" on a semantic level to determine whether it refers to a person's first name or last name, before passing the communication.

Similarly, it may be the case that a word is used to have a first meaning in a first field, and a second meaning in a second field. For example, to one business entity, the term "IBM" might refer to the company International Business Machines, and might refer to IBM in this context as a "customer," while another enterprise uses the term IBM under the category of "supplier," while still another business entity might refer to IBM in the context of another acronym altogether. Here again, the trust service 118 may use the XML schema to parse such terms on a semantic level, and determine their context and meaning to thereby facilitate communications between the partners 102 and 104, and the trusted third party 112.

In the example of FIG. 1, the trust service 118 parses the trust determination request and, using the internal look-up database 120 and registry 110, determines that the request relates to an ad-hoc assembly of a supply chain (such as a supply chain for assembling a passenger jet, as referred to above). Then, the trust service 118 and/or the registry 110 identify that the trusted third party 112 specializes in ad-hoc assembly of supply chains, while the trusted third parties 114 and 116 are associated with other specialties.

Accordingly, the trust service 118 and/or registry 110 contacts the trusted third party 112. In one implementation, the trusted third party 112 provides trust validation using a web service 132. More generally, as shown with respect to trusted third parties 114 and 116, the trusted third party 112 may contain some type of contact or interface information 134 that is obtained by the trust service 118. In the case of the trusted third party 112 having the web service 132, the interface information may include a WSDL access interface that is detected by the trust service 118.

The trust service 118 may communicate with the trusted third party 112 to determine whether it is qualified and capable of making a trust judgment with respect to the criteria established within the trust determination request. In some instances, the trust service 118 may communicate with multiple trusted third parties, in order to determine which is best-suited to deal with a given trust determination request. In other instances, the trust service 118 may be used merely to rule out certain trusted third parties, based on, for example, their areas of specialty, and may then allow the first partner 102 to make the final determination as to which trusted third party is used to make the trust determination.

The trust service 118 aggregates information from the trusted third party 112, perhaps together with information from the internal look-up database 120, and passes this information back to the first partner 102. In some implementations (in particular, in implementations in which the trusted third party 112 includes the web service 132), the trust service 118 may provide the first partner 102 with access information for the trusted third party 112. Such access information may include, for example, a name and contact information for the trusted third party 112.

More particularly, the access information may include information for creating and/or maintaining an active session with the web service 132, so that, for example, the trust service 118 may simply hand off this active session to the first partner 102. In related implementations, the trust service 118 itself may directly gain access to the trusted third party 112, and thereafter mediate communications between the first partner 102 and the trusted third party 112. In particular, the trust directory 108 may include a monitor service 136 that is operable to monitor communications between the first partner 102, the trusted third party 112, and the second partner 104.

Once the first partner 102 is in communication with the trusted third party 112 and determines that the second partner 104 is, in fact, a suitable partner for forming the business collaboration 106, then the first partner 102 and the second partner 104 may implement the business collaboration 106 by communicating directly with one another, by communicating through the trusted third party 112, and/or by communicating through the trust directory 108.

In the latter case, it should be understood that the monitor service 136, which may itself be implemented as a web service, may monitor the business collaboration 106, either continually or intermittently, and/or throughout its formation, active phase, and dissolution. Then, the monitor service 136 may make the resulting information available to the internal look-up database 120.

In this way, over time, the trust directory 108 may improve its knowledge base and therefore better contribute in the future to the formation and implementation of business collaborations. It should be understood that the trust directory 108, in its described position as a meta-third party, is able to monitor information from a vantage point that is not generally available to one of the individual trusted third parties 112, 114, and 116.

For example, in the situation described above, the trust directory 108 may monitor the partners 102 and 104, as well as the trusted third party 112, in their capacities with respect to the business collaboration 106. Nonetheless, the information collected by the monitor service 136 may be available to the trust directory 108 for all future operations, even those that are not directly or apparently related to an ad-hoc assembly of a supply chain.

For example, in the context of the business collaboration 106, the monitor service 136 may determine that the second partner 104 has a certain capacity with respect to the production of a particular passenger jet component. Such information may be useful at a later date, for example, if the trust directory 108 receives a request from another potential partner (not shown) for a business collaboration in the field of collaborative engineering. In particular, even if a separate trusted third party (e.g., the trusted third party 114) is used to perform the trust determination in the specialty of collaborative engineering, the information about the second partner 104 will be available to the trust directory 108, but would not necessarily have otherwise been available to the trusted third party 114.

FIG. 1 has been described with respect to a scenario in which the first partner 102 seeks a partner by submitting the trust determination request to the trust directory 108, which initiates contact with the trusted third party 112, which, in turn, identifies the second partner 104 and verifies the second partner against the criteria of the trust determination request as being suitable for participation in the business collaboration 106. Of course, many other scenarios are possible.

For example, both the partners 102 and 104 may simultaneously, or asynchronously, submit trust determination requests, and may do so in conjunction with one another, or independently of one another. The trust directory 108 may return a single trusted third party to facilitate formation of the business collaboration 106, or may return more than one (for selection by the initiating partner(s)). The trusted third party 112 may verify a single proposed partner (e.g., the second partner 104), or may verify a plurality of proposed partners, or may present the plurality of proposed partners for selection therefrom by the initiating partner (e.g., the first partner 102). The business collaboration 106 may include more than two partners, and such partners may be added, subtracted, or replaced, as needed.

The monitor service 136 may be fully automated, as generally described above, semi-automated, or manual. For example, the monitor service 136 may be implemented by issuing periodic feedback requests or surveys to participating partners. As another example, the monitor service 136 may refer to manually-initiated feedback or data collection.

Use of the trust directory 108 in mediating communications between the business collaboration 106, its partners 102 and 104, and/or the trusted third party 112 may be particularly advantageous or appropriate when the business collaboration 106 is intended to have a relatively lengthy duration, or to be particularly resource-intensive. Similarly, the monitor service 136 may be particularly appropriate in such circumstances. In contrast, if the business collaboration 106 is to be short-lived or require limited use of resources, then the various participants may decide that such a collaboration does not warrant the use of the trust directory 108 for mediation, or of the monitor service 136 for monitoring (and may therefore communicate more directly with one another).

Also, communications between the various entities illustrated in FIG. 1 may make use of other, or additional, messaging techniques, such as, for example, Electronic Data Interchange (EDI). EDI, generally speaking, provides a collection of message formats and element definitions, so that business entities may exchange data using virtually any electronic messaging service. EDI provides one technique by which businesses may define and exchange information regarding, for example, business practices and terminology. In addition to the tagging standards, validation techniques, and search techniques provided by XML, as described above, EDI allows the trust directory 108 to accurately and quickly parse the trust determination request.

Figure 2:
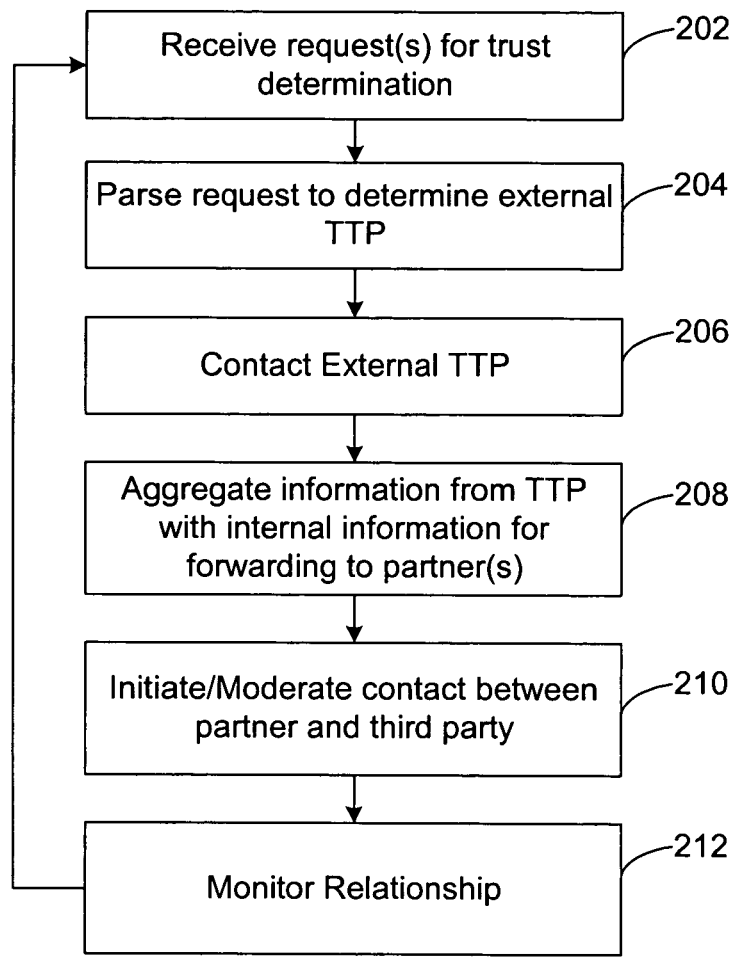
FIG. 2 is a flowchart illustrating a process for using the trust determination system of FIG. 1.

FIG. 2 is a flowchart illustrating a process 200 for using the trust determination system 100 of FIG. 1. In FIG. 2, the trust directory 108 receives one or more requests for a trust determination from one or more partners (202). As described, the request includes criteria or other parameters desired by the requesting partner for formation of a business collaboration, and is formulated according to a data model and/or messaging format that allows the trust directory 108 to interpret data within the request in a meaningful way.

The trust directory 108 then parses the request to determine (and/or rule out) one or more external trusted third parties (204). The trust directory 108 may use internal information, including information gained using the monitor service 136 during past formation or operation of business collaborations, to determine and contact the trusted third party (206).

In particular, the trust directory 108 may determine a specialty that would be appropriate, based on the trust determination request, and, using the registry 110, may contact only those third parties that have corresponding specialties. Upon contacting the trusted third party, the trust directory may exchange only interface information with the trusted third party, or may directly obtain access information for communicating with the trusted third party.

Accordingly, the trust directory 108 aggregates the information obtained from the trusted third party, together with internally available information, for forwarding to the party which previously sent the trust determination request (208). The trust directory 108 then initiates and/or moderates contact between the requesting partner and the third party (210). Finally, if desired, the trust directory 108 may monitor the business collaboration 106 that results from the above-described verification process.

In FIG. 2, it should be understood that the described processes are not intended to be limiting of the ways in which the trust directory 108 may be implemented. For example, the described processes may be performed in a different order, some of the processes may be omitted if not required, and some of the processes may be combined with one another, or with other processes.

FIGS. 3A-3C are charts illustrating trust factors used by the trust determination system of FIG. 1 in making a trust determination. In FIG. 3A, a resources table 302 conceptually represents the type of factors that the trusted third party 112, the trust directory 108, or the trust registry 110 may consider in making a trust determination regarding potential partners X, Y, and Z.

Particularly, the resources table 302 illustrates that relevant factors include a total number of employees (or a number of employees in a particular business division), an annual revenue, and an amount of relevant assets that are currently available for use in the proposed project for each of the potential partners. For example, if a potential partner X has only a limited number of employees or a limited annual revenue, the trusted third party 112 may determine that this partner will simply not have sufficient resources to participate in projects of extended scope.

Similarly, in FIG. 3B, a reliability table 304 illustrates factors related to reliability for each of the potential partners. Such factors may include, for example, a number or percentage of previous orders that were successfully met by the potential partner, a number of available workers, and a number or percentage of previous delays that were previously experienced by each partner in similar circumstances or projects.

In FIG. 3C, an economic factors table 306 illustrates factors related to economic decisions that should be made with respect to each partner. For example, each partner may have a price associated with the type of part or component that it would be expected to produce. An exchange rate may need to be considered for foreign partners using a different currency than an initiating partner, and, similarly, costs associated with an actual delivery of the components, once assembled, also may need to be considered.

Thus, in practice, a trust determination request received from the partner 102 includes criteria or parameters describing a desired business collaboration. Continuing with the examples discussed herein, the request may include criteria for assembling a number of passenger jets, including, for example, a number and type of components that must be produced and/or assembled, prices for the components, and a time frame for production of the components.

The trust determination system 100 may then parse the request to determine that prices for the component(s) are an economic factors issue, and consult the corresponding table 306. Similarly, the system 100 may determine that the time frame for production of the components is a reliability issue, and consult the table 304. Of course, the various factors listed in FIGS. 3A-3C need not be stored in the described tabular format, and may be stored in any suitable format. Moreover, many other factors aside from those illustrated in FIG. 3 may be considered (including, or in addition to, those mentioned above), such as, for example, communications/interface issues between partners, or expertise factors related to a number of employees with a certain level of education or experience in a given field.

It should be understood, however, that the originally-requesting partner need not consider or otherwise have knowledge of these factors; rather, the partner merely needs to identify the original criteria for the collaboration, perhaps using a graphical user interface associated with the trust service 118 to enter the criteria in a manner and language that is convenient and familiar to the partner. Then, even though this manner and language may not initially match that of the other potential partners (or the trusted third party), the trust determination system 100 is able to correlate the parameters and make a determination as to whether the partners will be able to trust one another to a desired level during the proposed business collaboration.

Figure 4:
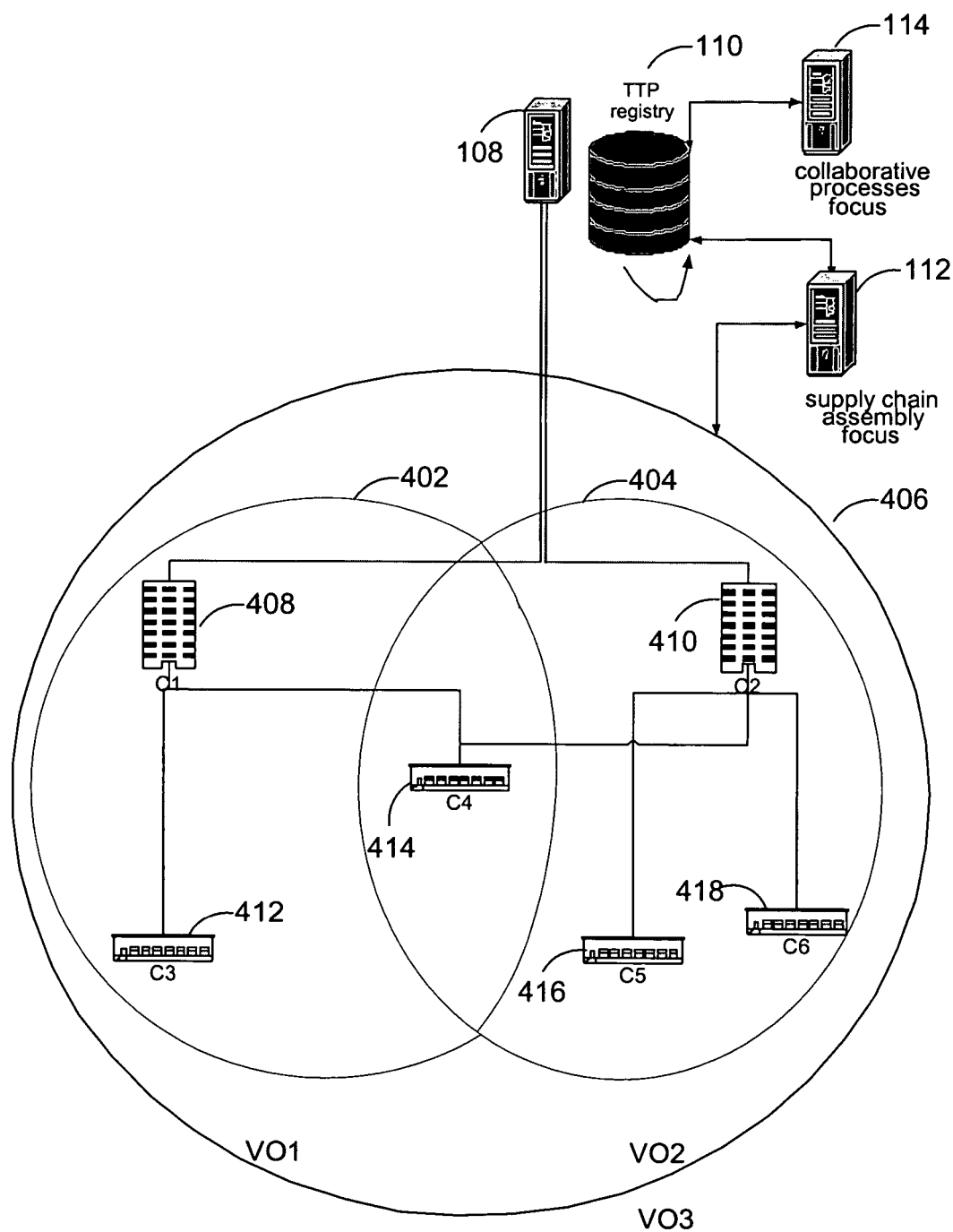
FIG. 4 is a block diagram of another implementation of the trust determination system of FIG. 1.

FIG. 4 is a block diagram of another implementation of the trust determination system of FIG. 1. In FIG. 4, a first virtual organization 402 and a second virtual organization 404 seek to form a third virtual organization 406. In this context, a virtual organization generally refers to any organization using distributed human, physical, and/or knowledge resources, that is united using information technology systems that allow the resources to perform value-added functions and services. Such virtual organizations may be well-suited for use of the trust determination systems described herein.

The first virtual organization 402 includes a company 408 that is a primary contact point for the virtual organization 402. Similarly, the second virtual organization 404 includes a company 410 that is a primary contact point for the virtual organization 404. The first virtual organization 402 further includes a company 412 and a company 414. The company 414 is common to the second virtual organization 404, as shown, and the second virtual organization further includes a company 416 and a company 418.

Continuing the examples discussed above, the first virtual organization 402 may include the company 408 representing a manufacturer of passenger jets, which may receive an order for fifty jets from an airline. The companies 412 and 414 that make up the virtual organization 402 in addition to the manufacturer 408 may have certain production specialties, such that, for example, the virtual organization 402 specializes in production assembly of wings for the passenger jets.

The virtual organization 404 may advertise itself as specializing in production or design of other jet components, such as, for example, an interior cabin or passenger space of the jets. The virtual organization 402 may become aware of the virtual organization 404 through sources such as, for example, industry marketplaces or trade journals, or may have prior knowledge of the virtual organization 404, or of its participating companies.

The virtual organization 402 (specifically, the manufacturer 408) may thus contact the trust directory 108 for a trust determination request. The manufacturer 408 uses a graphical user interface to enter its criteria for a partner to design and build a cabin space for its jets, perhaps specifying the virtual organization 404 as the potential partner, where the interface is compatible with existing systems, infrastructure, and semantics of the virtual organization 402.

The trust directory 108 parses the request, and, in conjunction with the registry 110, determines that the trusted third party 112, specializing in assembly of supply chains, is the appropriate third party to contact. In one implementation, the trust directory 108 and registry 110 communicate the request from the manufacturer 408 to the third party 112, including any internal information regarding either of the virtual organizations 402 and 404 that the trust directory 108 and registry 110 may contain that may be useful to the third party 112 (e.g., information obtained from previous monitoring of the virtual organizations 402 and 404, or of their respective members).

The trust directory 108 may then contact the third party 112 to exchange interface information, and then aggregate this interface information with any relevant internally-available information for forwarding to the virtual organizations 402 and 404. Then, the contact companies 408 and 410 have all the information necessary to contact the third party 112 directly.

If desired, and as referred to above, the trust directory 108, instead of obtaining only interface information, may directly facilitate and mediate contact between the virtual organizations 402/404 and the trusted third party 112. In this case, it may be particularly advantageous for the trust directory 108 to monitor communications between and among the newly-formed virtual organization 406 and the third party 112, so as to add to the knowledge base of the trust directory 108.

In some implementations, the look-up protocol used by the trust determination systems described herein may operate similarly to look-up services that provide naming or directory services. For example, domain name lookup services are used to obtain information on remote machines or programs, and to enable communication with the machines or programs. One such lookup service is known as the Directory Name Service (DNS), which is generally used to map Internet Protocol (IP) addresses to corresponding machine names. This DNS mapping may be used, for example, to look up an IP address associated with a machine name, and then to use the IP address to establish communication with that machine. Similarly, for example, the trust directory 108 maps a trust determination request and its associated parameters to a trusted third party, and thereby enables and/or establishes communication with the third party.

It should be understood from the above description that the described techniques for identifying and/or selecting potential partners for business collaborations are advantageous over alternative techniques. For example, third parties who are trusted by all potential partners may be used independently of the trust determination system 100. As described, such third parties may be used, for example, to provide or verify information regarding the potential partners, to thereby determine whether the partner(s) can reliably be trusted to perform to a given level. In such cases, the first partner 102 might independently provide a set of criteria to the third party, without use of the trust directory 108, and the third party might have access to a number of potential partners and/or to some type of description of the capabilities of the potential partners (to match against the set of criteria).

Although the results of these techniques may be satisfactory in a given circumstance, it should be understood from the above description that it also is true that the first partner 102 may not initially know of such a trusted third party. Even if known, use of the trusted third party may be time-consuming and/or resource-intensive, and may involve too long of a process, particularly if the business collaboration must be formed in a very short time frame.

Other techniques for forming business collaborations than those described herein include the use of static look-up resources, which list businesses or other entities according to, for example, their areas of specialty and/or their own indication of a desired type or amount of work that they would like to perform. By using such resources, the first partner 102 might be able to locate a business that ostensibly fits its desired criteria, and, moreover, might do so in a relatively short time frame. However, such static resources may not provide sufficient resources by which the first partner 102 is able to verify the information contained therein to a desired level of confidence or trust.

In contrast, the trust determination system(s) described herein are capable of using some or all of the features of such conventional techniques, while also providing a meta-third party that facilitates and automates the process. Moreover, the trust determination system(s) enable ongoing measurement and evaluation of the thus-formed collaborations, so that proper adjustments may be made when necessary, for example, to remove problematic partners from the relationship. In this way, the trust determination system(s) provide fast, flexible, and risk-reduced techniques for partners to find and join one another for successful completion of business collaborations.

A number of implementations have been described. Nevertheless, it will be understood that various modifications may be made. Accordingly, other implementations are within the scope of the following claims.

What is claimed is:

1. A computer-implemented method comprising:
    monitoring, at a trust service, a business capacity of a potential partner entity which is participating in an existing business collaboration, wherein the business capacity includes reliability, expertise, or availability characteristics associated with the potential partner entity;
    receiving, at the trust service from a requesting entity, a trust determination request to perform a trust determination on the potential partner entity, the request identifying the potential partner entity and specifying requirements of a desired business collaboration between the requesting entity and the potential partner entity;
    selecting, at the trust service, a trusted third party responsible for performing the trust determination based on a type of the desired business collaboration identified in the trust determination request;
    determining, at the trust service, using information received from the selected trusted third party, that the potential partner entity satisfies the specified requirements based at least upon the monitored business capacity of the potential partner entity in the existing business collaboration;
    authorizing, at the trust service, the desired business collaboration in response to determining that the potential partner entity satisfies the specified requirement; and
    facilitating and monitoring communications relating to the authorized desired business collaboration between the requesting entity and the potential partner entity at the trust service.

2. The method of claim 1 wherein receiving, at the trust service from the requesting entity, the trust determination request comprises:
    receiving the trust determination request in a format that is selected to permit communication between the requesting entity, the potential partner entity, and the trusted third party wherein the trusted third party obtains information regarding the specified requirements from the potential partner entity.

3. The method of claim 1, further comprising:
    mediating communication between the requesting entity and the trusted third party, during which the trusted third party authorizes the desired business collaboration at the trust service.

4. The method of claim 1, further comprising:
    accessing collaboration communications to use in conjunction with the specified requirements to determine the trusted third party at the trust service.

5. The method of claim 1, further comprising:
    selecting, at the trust service, the potential partner entity from among a plurality of potential partner entities that possess desired abilities with respect to the desired business collaboration.

6. A system comprising a processor configured to:
    monitor, at a trust service, a business capacity of a potential partner entity which is participating in an existing business collaboration, wherein the business capacity includes reliability, expertise, or availability characteristics associated with the potential partner entity;
    receive, at the trust service from a requesting entity, a trust determination request to perform a trust determination on the potential partner entity, the request identifying the potential partner entity and specifying requirements of a desired business collaboration between the requesting entity and the potential partner entity;
    select, at the trust service, a trusted third party responsible for performing the trust determination based on a type of the desired business collaboration identified in the trust determination request;
    determine, at the trust service, using information received from the selected trusted third party, that the potential partner entity satisfies the specified requirements based at least upon the monitored business capacity of the potential partner entity in the existing business collaboration;

authorize, at the trust service, the desired business collaboration in response to determining that the potential partner entity satisfies the specified requirements; and facilitate and monitor communications relating to the authorized desired business collaboration between the requesting entity and the potential partner entity at the trust service.

7. A computer program product tangibly embedded in a non-transitory machine-readable medium the computer program product comprising instructions that, when read by a machine, operate to cause a data processing apparatus to:

monitor, at a trust service, a business capacity of a potential partner entity which is participating in an existing business collaboration, wherein the business capacity includes reliability, expertise, or availability characteristics associated with the potential partner entity;

receive, at the trust service from a requesting entity, a trust determination request to perform a trust determination on the potential partner entity, the request identifying the potential partner entity and specifying requirements of a desired business collaboration between the requesting entity and the potential partner entity;

select, at the trust service, a trusted third party responsible for performing the trust determination based on a type of the desired business collaboration identified in the trust determination request;

determine, at the trust service, using information received from the selected trusted third party, that the potential partner entity satisfies the specified requirements based at least upon the monitored business capacity of the potential partner entity in the existing business collaboration;

authorize, at the trust service, the desired business collaboration in response to determining that the potential partner entity satisfies the specified requirements; and facilitate and monitor communications relating to the authorized desired business collaboration between the requesting entity and the potential partner entity at the trust service.

8. The method of claim 1, wherein the monitoring is continuous through the existing business collaboration until dissolution of the existing business collaboration.

9. The method of claim 1, wherein the monitoring is intermittent through the existing business collaboration until dissolution of the existing business collaboration.

10. The method of claim 1, wherein the potential partner entity satisfies the specified requirements based at least upon an advertised capacity of the potential partner entity in addition to the monitored business capacity of the potential partner entity.

11. The method of claim 1, further comprising:
excluding, at the trust service, trusted third parties based on a specialty associated with the trusted third parties.

12. The method of claim 1, wherein the business capacity is determined based on a number of employees currently available for use in the desired business collaboration.

13. The method of claim 1, wherein the business capacity is determined based on a percentage of orders of existing collaboration that have been satisfied.

14. The method of claim 1, further comprising:
determining, at the trust service, a specialty based on the trust determination request, wherein the trusted third party is selected only if the trusted third party is associated with the specialty.

15. The method of claim 1, wherein the trusted third party is selected based on past formations of business collaborations that included the trusted third party.

16. The system of claim 6, wherein the potential partner entity satisfies the specified requirements based at least upon an advertised capacity of the potential partner entity in addition to the monitored business capacity of the potential partner entity.

17. The system of claim 6, wherein the business capacity is determined based on a number of employees currently available for use in the desired business collaboration.

18. The system of claim 6, wherein the business capacity is determined based on a percentage of orders of existing collaboration that have been satisfied.

19. The system of claim 6, wherein the trusted third party is selected based on past formations of business collaborations that included the trusted third party.

* * * * *